United States Patent
Wang et al.

(10) Patent No.: US 11,851,350 B1
(45) Date of Patent: Dec. 26, 2023

(54) DOUBLE CHARGE COMPOSITE MATERIALS FOR CONTAMINANT REMOVAL AND METHODS OF MAKING THE SAME

(71) Applicant: National Technology & Engineering Solutions of Sandia, LLC, Albuquerque, NM (US)

(72) Inventors: Yifeng Wang, Albuquerque, NM (US); Andy Miller, Emporia, KS (US); Jessica N. Kruichak, Albuquerque, NM (US); Melissa Marie Mills, Albuquerque, NM (US); Hernesto Tellez, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 97 days.

(21) Appl. No.: 15/793,613

(22) Filed: Oct. 25, 2017

(51) Int. Cl.
| | |
|---|---|
| *C02F 1/28* | (2023.01) |
| *B01J 20/08* | (2006.01) |
| *B01J 20/12* | (2006.01) |
| *B01J 20/30* | (2006.01) |
| *B01J 43/00* | (2006.01) |
| *B01J 39/02* | (2006.01) |
| *B01J 41/02* | (2006.01) |
| *B01J 47/00* | (2017.01) |

(52) U.S. Cl.
CPC .............. *C02F 1/288* (2013.01); *B01J 20/08* (2013.01); *B01J 20/12* (2013.01); *B01J 20/3085* (2013.01); *B01J 43/00* (2013.01); *B01J 39/02* (2013.01); *B01J 41/02* (2013.01); *B01J 47/00* (2013.01); *B01J 2220/42* (2013.01); *C02F 1/281* (2013.01)

(58) Field of Classification Search
None
See application file for complete search history.

(56) References Cited

U.S. PATENT DOCUMENTS

| | | | | |
|---|---|---|---|---|
| 4,642,193 A | * | 2/1987 | Miyata | G21F 9/12 |
| | | | | 210/682 |
| 6,800,578 B2 | * | 10/2004 | Stamires | B01J 23/007 |
| | | | | 423/600 |
| 2006/0134154 A1 | * | 6/2006 | Giles | A61K 8/26 |
| | | | | 424/401 |
| 2010/0203152 A1 | * | 8/2010 | Newton | A61K 9/2027 |
| | | | | 424/497 |
| 2014/0175015 A1 | * | 6/2014 | Nishimi | B01J 20/18 |
| | | | | 210/667 |
| 2017/0225145 A1 | * | 8/2017 | Lee | B01J 20/3078 |

FOREIGN PATENT DOCUMENTS

| | | | | |
|---|---|---|---|---|
| CN | 106745447 A | * | 5/2017 | |
| WO | WO-2016052838 A1 | * | 4/2016 | .......... B01J 20/3078 |

OTHER PUBLICATIONS

Grover et al. (Applied Clay Science, 2010, 48, 631-637). (Year: 2010).*
Yadav et al. (Catena, 2012, 100, 120-127). (Year: 2012).*
Adamis et al. ("Bentonite, Kaolin, and Selected Clay Minerals", World Health Organization, 2005, pp. 1-169). (Year: 2005).*
Machine translation of CN 106745447A, pp. 1-4 (Year: 2017).*
Baskaran et al. (RSC Adv., 2015, 5, 98853-98875). (Year: 2015).*
Pless, J.D., Philips, M.L.F., Voigt, J. A., Moore, D., Axness, M., Krumhansl, J.L., Nenoff, T.M.; Desalination of Brackish Waters Using Ion Exchange Media; 2006; SAND2006-0879J.
Wang, Y. and Gao, H.; Compositional and structural control on anion sorption capability of layered double hydroxides (LDHs); J. Colloid Interface Sci.; 2006; 301; 19-26.
Wang, Y., Gao, H., Yeredla, R, Xu, H, and Abrecht, M.; Control of surface functional groups on pertechnetate sorption on activated carbon; J. Colloid Interface Sci.; 2007; 305; 209-217.

* cited by examiner

*Primary Examiner* — Clare M Perrin
(74) *Attorney, Agent, or Firm* — Daniel J. Jenkins

(57) ABSTRACT

A method for removing a contaminant from a fluid is provided. A positively charged layered double hydroxide is combined with a negatively charged clay material to form adsorption material. The adsorption material is contacted with an aqueous solution containing the contaminant to adsorb the contaminant onto the adsorption material.

11 Claims, No Drawings

DOUBLE CHARGE COMPOSITE MATERIALS FOR CONTAMINANT REMOVAL AND METHODS OF MAKING THE SAME

STATEMENT REGARDING FEDERALLY SPONSORED RESEARCH OR DEVELOPMENT

This invention was developed under Contract No. DE-NA0003525 between the United State Department of Energy and National Technology & Engineering Solutions of Sandia, LLC, for the operation of the Sandia National Laboratories.

BACKGROUND OF THE INVENTION

The application generally relates to a double charge composite material. The application relates more specifically to a double charge composite material for use in contaminant removal in aqueous solutions and in the retardation of colloid formation.

Flocculants are used as additives in water treatment to remove particles and colloidal material from solution. Typically, flocculation treatment is done immediately after gravity settling of grit. The most common flocculants are ferrous sulfate or alum. Both of these materials precipitate as metal oxides with large surface areas and high sorption capacities. Sorption capacity is dictated by surface charge development due to unsatisfied bonds at the solid/solution interface.

Flocculants that use ferrous sulfate and alum cannot remove cations and anions from water simultaneously because they are composed of a single material. Additionally, the surface charge of such compounds is dictated by solution conditions, such as pH. Typically, anion or cation removal will be favored for a given compound, so that the compounds are unable to remove significant amounts of both types of ions. Removal of a cation or an anion separately would create an extreme pH swing that would diminish the effectiveness of the process.

Activated carbon can be used in some applications. Activated carbon is a complex mixture of surface functional sites that, for certain aqueous conditions, have a concomitant mixture of surface charge environments. This surface heterogeneity greatly contributes to the proven performance of active carbon as a broad spectrum sorbent. However, active carbon is not a suitable barrier material for long-term geologic disposal of nuclear waste.

Organic polyelectrolyte materials have been used to stop particles. However, the use of such materials requires active management, which is unrealistic for nuclear waste scenarios. Additionally, these materials are unsuitable because the materials have increased potential to breakdown under high heat or high radiation fields during the long waste isolation periods.

Natural clays have many favorable qualities leading to their use in waste isolation scenarios, including in nuclear waste disposal and as a barrier material in hazardous waste landfills, due to their low hydraulic conductivity, high sorption capacity for metals/radionuclides, and swelling capacity to self-seal fractures or damage caused by construction of the waste repository. However, natural clays tend to form clay colloids that can transmit otherwise strongly sorbing contaminants long distances, which can be undesirable in certain waste disposal applications. Furthermore, natural clays are usually negatively charged and thus amendable only for cation removal.

Colloid formation in clays can be dependent upon the chemical and physical attributes of the water in contact with the clay. Clay colloid formation can be enhanced when the ionic strength of the solution is low, pH is high and pore water velocity is fast.

What is needed is a composition and/or method that can overcome the limitations of natural clays, organic polyelectrolyte materials, activated carbon, ferrous sulfate, and/or alum in flocculation and other similar applications. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a composition for use in an aqueous solution that includes between about 1 and 50% of an anionic layered double hydroxide, and between 50 and about 99% of one or more cationic clay materials.

Another embodiment relates to a method for removing a contaminant from a fluid. A positively charged layered double hydroxide is combined with a negatively charged clay material to form adsorption material. The adsorption material is contacted with an aqueous solution containing the contaminant to adsorb the contaminant onto the adsorption material.

Alternative exemplary embodiments relate to other features and combinations of features as may be generally recited in the claims.

DETAILED DESCRIPTION OF THE INVENTION

Before turning to the exemplary embodiments in detail, it should be understood that the application is not limited to the details or methodology set forth in the following description. It should also be understood that the phraseology and terminology employed herein is for the purpose of description only and should not be regarded as limiting.

The disclosure relates to advanced forms of a double charged composite material that includes positively charged layered double hydroxides and negatively charged clay materials to produce a composite material that is composed of two oppositely charged components. The charges of both materials are dominated by lattice substitutions which exhibit themselves as fixed charges. The composite material can be used in applications involving a wide range pH conditions without being subject to surface charge reversals with variations in solution pH.

The composite material can be a novel, inorganic material that is a mixture of a layered double hydroxide and a swelling clay. The material can be used to remove contaminants, such as ions, from aqueous solutions and can be used as a flocculant. The material can demonstrate the capability to reduce colloid formation under low ionic strength and highly advective conditions. This material could be added to the outer fringes of waste barriers to minimize the formation of colloids.

In one exemplary embodiment, a composition is formed by mixing one or more anionic layered double hydroxides and one or more cationic clay materials. The exemplary composition can be made by combining positively charged layered double hydroxides with a negatively charged natural clay materials. The cationic clay materials can include octahedral layers and tetrahedral layers. In some embodiments, the cationic clay materials can have silica that is partially replaced with alumina and have cations in the interlayer for charge balance.

The cationic clay materials can include any suitable clay material, such as smectite, illite, other clay minerals or their combinations. In some embodiments, the cationic clay material is a smectite rich clay material. In other embodiments, the cationic clay material is a both a smectite-rich clay material and a non-swelling clay mineral. Specifically, the cationic clay materials can include montmorillonite clay, such as the montmorillonite clay that can be obtained from the Clay Bank Repository at Purdue University.

The layered double hydroxides can have octahedral divalent metal (e.g., magnesium and calcium) hydroxide layers in which divalent cations are partially replaced by trivalent ions, such as trivalent aluminum, trivalent chromium and/or trivalent zinc. The layered double hydroxide can be the Mg—Al layered double hydroxide NC-88. The layered double hydroxide can be prepared through any suitable method, including co-precipitation and/or through the methods disclosed in U.S. Pat. No. 7,238,288, which is incorporated herein by reference.

The compositions can be formed through chemical or physical mixing. In some embodiments, the layered double hydroxides can be combined with the clay materials in solution, which can be allowed to flocculate and settle. The solid phase can be collected, dried and calcined at 600° C. for two hours. In other embodiments, the layered double hydroxides can be physically mixed with the clay materials.

The chemical or physical mixing of the layered double hydroxides with the clay materials represents an advance over the conventional approach which involves sequential use of two oppositely charged materials to remove aqueous ions. The conventional approach results in extremely large pH variations in the process steps, which severely limits the efficacy of the ion removal process.

The compositions can act as flocculants in aqueous systems. The compositions can remove contaminants, both cationic and anionic, from aqueous solutions. The compositions can remove colloids from solutions, simultaneously, as well. The compositions can retard the migration of clay colloids in saturated groundwater systems. The compositions can be added to a waste barrier to help limit the erosion of clays in the barrier and limit the colloidal transport of contaminants. The compositions can inhibit colloid suspension and transport under water-saturated conditions.

The composition of the material can be tailored to remove specific ions and/or contaminants by manipulating the composition of the layered double hydroxide, the composition of the clay materials and/or the ratio of layered double hydroxide to clay material. In some embodiments, the compositions can remove up to 97% of anions tested.

In another exemplary embodiment, the composition of the composite material can include between about 1 and 50 wt. % of the anionic layered double hydroxide and between 50 and about 99 wt. % of one or more cationic clay materials. In another exemplary embodiment, the composition can include between about 10 and 50 wt. % of the anionic layered double hydroxides. The balance can be one or more cationic clay materials. The ratio of anionic layered double hydroxide to the cationic clay materials can be a preselected ratio that corresponds to one or more target ions in the aqueous solution.

In some embodiments, the composition can be prepared by mixing layered double hydroxide NC-88 and montmorillonite in a 1:1 weight to weight ratio. In other embodiments, the composition can be prepared by mixing layered double hydroxide NC-88 and montmorillonite in a 1:9 weight to weight ratio. The layered double hydroxide NC-88 can be prepared by co-precipitation. The materials can be mixed with continuous stirring in a common solution containing the ions of interest.

In the layered double hydroxide NC-88, $Al^{3+}$ substitutes for some fraction of $Mg^{2+}$ in a brucite layer (i.e., $Mg(OH)_2$). The excess of positive charge creates a fixed, positively charged field around the material. In montmorillonite, the opposite is true with a divalent metal, such as $Mg^{2+}$, substituting for $Al^{3+}$ in the octahedral sheets of the clay mineral structure. This charge deficit is exhibited by a fixed negative charge surrounding the particle. Because the charge is caused by lattice substitutions and not from unsatisfied chemical bonds at the water/solid interface, the amount of charge is unaffected by solution conditions such as pH and ionic strength.

When the layered double hydroxide NC-88 is mixed with the cationic clay in an aqueous solution, the oppositely charged particles interact, leading to a large floc which settles quite quickly. During the flocculation and settling process, the opposite fixed charges are capable of removing both cations and anions through surface reactions such as sorption and ion exchange.

The clays can be mixed with sands to achieve specific physical properties in nuclear and other waste isolation scenarios. Under these conditions, the hydraulic conductivity can be higher than that of clay alone, the average pore diameters are larger, and erosion of clay particles is expected to be larger. In both nuclear and other waste isolation scenarios, colloid facilitated contaminant transport is a critical issue.

The formation of a colloidal phase creates a ternary system where a contaminant can be in the dissolved phase, sorbed to the colloid, or sorbed to the porous media. If conditions favor colloid transport, any contaminant sorbed to the colloid will be transported as well. This migration mechanism has been to shown to be particularly important for any metal that is strongly sorbing, such as the actinides, uranium, plutonium, americium, and curium.

Minimizing clay colloid transport away from a repository site or landfill site is important to both maintain the engineered properties of the liner, and to minimize colloid facilitated transport.

In some embodiments, the layered double hydroxides can include a crystalline, layered, double hydroxide (LDH) metal complex of the general formula:

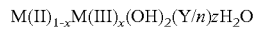

$$M(II)_{1-x}M(III)_x(OH)_2(Y/n)zH_2O$$

wherein M(II) is a divalent metal cation, M(III) is a trivalent metal cation, x is a positive number between 1.5 and 12, Y is an interlayer anion, such as $CO_3^{2-}$, $SO_4^{2-}$, $PO_4^{3-}$, $NO_3^-$ or other. n is the charge of the interlayer anion, and z is a positive number. M(II) can be a divalent metal, such as $Co^{2+}$, $Ni^{2+}$, $Zn^{2+}$, $Mg^{2+}$, $Cu^{2+}$, $Cr^{2+}$, $Mn^{2+}$, and $Fe^{2+}$. M(III) can be a trivalent metal, such as $Cr^{3+}$, $Al^{3+}$, $Fe^{3+}$, $Sc^{3+}$, $Ti^{3+}$, $V^{3+}$, $Mn^{3+}$, $Co^{3+}$, $Ni^{3+}$, $Rh^{3+}$, $Ru^{3+}$, and $Ir^{3+}$.

In aqueous systems, the compositions can act as flocculants to remove ions and other contaminants from solutions colloids. The compositions have a wide range of applications, such as in drinking water treatment, wastewater treatment, desalination, industrial wastewater treatment, and treatment of hydro-fracking water in oil and gas wells. The settling rates for the compositions, when used as flocculants, are comparable to traditional iron and aluminum-based flocculants currently used in water treatment.

The compositions can be used as an engineered barrier in subsurface remediation applications, such as in landfill liners. The compositions can be used in waste isolation applications, including as backfill or buffer materials for nuclear waste repositories or radioactive waste treatment. The compositions can be used to uptake radio nuclei if they are released. The compositions can be used for controlling soil erosion and nutrient loss in agriculture because the compositions can immobilize cations, anions and colloids, at the same time.

In agriculture, the compositions can be used for controlling soil erosion and nutrient loss. The compositions have high sorption capabilities for both cations and anions, so that the compositions can be used as barrier materials for waste containment and site remediation. The compositions can replace bentonite materials in applications involving radioactive waste isolation because the compositions have a much higher radionuclide sorption capacity and greatly reduced colloidal release.

The compositions can retard and/or stop the formation of clay colloids, even under conditions where large amounts of colloids are expected. The compositions are inexpensive and can be added to the fringes of a clay barrier. The compositions will survive the disposal environment for extended periods of time, since the compositions are inorganic. Slight changes to solution conditions (e.g., ionic strength or pH) will not change the behavior because the material properties are based on structural charges.

An exemplary method for removing a contaminant from a fluid can include combining a positively charged layered double hydroxide with a negatively charged clay material to form adsorption material. The adsorption material can be contacted with an aqueous solution containing the contaminant to adsorb the contaminant onto the adsorption material.

In preparing the mixture of positively charged layered double hydroxides and negatively charged clay materials, a divalent metal M(II) salt solution can be mixed with a trivalent metal M (III) salt solution at a desired M(II)/M(III) molar ratio. Next, the mixture is titrated with a basic solution, which can be either a $Na_2CO_3$ (15%) solution or a 4 M NaOH solution in the presence of a chosen interlayer anion with vigorous stirring at room temperature. The interlayer anion can be carbonate, sulfate, phosphate, or nitrate. The $Na_2CO_3$ (15%) solution is used only for synthesizing carbonate layered double hydroxides. The pH of the solution can be monitored, so that the titration is complete when the pH reaches a pH that is above the logarithmic values of the hydrolysis constants of the corresponding metal cations.

The resulting suspension can be aged for several hours at 60° C. in an isothermal oven. Then, the suspension is cooled to room temperature, filtered with 0.2 µm membranes, and rinsed with deionized water thoroughly to remove any excess salt. The resulting solid can be vacuum-dried at 40° C. to obtain the layered double hydroxide material.

The layered double hydroxide and the clay material can be mixed with continuous stirring in a common solution containing the ions of interest. Once the stirring was ceased, the flocs were allowed for gravity settling.

Example 1

In Example 1, mixtures of layered double hydroxides and clay materials were prepared. The layered double hydroxides were prepared by co-precipitation. A divalent metal M(II) salt solution was mixed with a trivalent metal M (III) salt solution at a desired M(II)/M(III) molar ratio. The mixture was then titrated with a basic solution, either a $Na_2CO_3$ (15%) or a 4 M NaOH solution with vigorous stirring at room temperature. The $Na_2CO_3$ solution was only used in the synthesis of carbonate layered double hydroxides.

The solution was synthesized in the presence of a chosen interlayer anion, which could be carbonate, sulfate or nitrate. The pH of the solution was monitored, and the titration was concluded when the pH reached above the logarithmic values of the hydrolysis constants of the corresponding metal cations. The resulting suspension was subsequently aged for several hours at 60° C. in an isothermal oven. The suspension was then cooled to room temperature, filtered with 0.2 µm membranes, and rinsed with deionized water thoroughly to remove any excess salt. The resulting solid was vacuum-dried at 40° C., and a layered double hydroxide material was finally obtained.

A layered double hydroxide and a clay material were mixed with continuous stirring in a common solution containing the ions of interest. Once the stirring was ceased, the flocs were allowed for gravity settling. Samples were withdrawn from the supernatant and centrifuged prior to analysis to ensure removal of any remaining particles. The results for anion removals are summarized in Table 1.

TABLE 1

Ion removals for selected ions

| Ion | Initial Conc. (mg/L) | Final Conc. (mg/L) | % removal |
| --- | --- | --- | --- |
| Fluoride | 20.04 | 0.63 | 96.9 |
| Nitrate | 20.38 | 14.05 | 31.1 |
| Sulfate | 19.21 | 0.48 | 97.5 |
| Iodide | 20.57 | 12.53 | 39.1 |
| Iodate | 22.02 | 0.97 | 95.6 |

Examples 2-4

In Examples 2-4, the mixtures of layered double hydroxides and clay materials that were prepared in Example 1 were used to inhibit the formation of colloids and retard previously produced colloids in saturated groundwater systems.

In Example 2, the layered double hydroxides and clay materials were combined in solution, allowed to flocculate and to settle. The solid phase was then collected, dried and calcined at 600° C. for 2 hours. Several different materials were created in this way by combining different mass ratios and both Al—Mg and Al—Zn types of NC-88. In Example 3, the layered double hydroxides and clay materials were combined through physical mixing alone.

The materials of Examples 2-3 were loaded into a model porous media in Example 4 to test for colloid formation and retention characteristics over several weeks. In Example 4, an advective column was divided into three zones. The first and third zones were filled with only clean sand. The middle zone was filled with a mixture of sand and the newly created materials.

The materials of Examples 2-3 were physically mixed with the sand in a 1:9 material/sand mass ratio. The sand and sand/material mixtures were loaded in lifts and compacted with a glass rod. As more material was added, the water level was increased so that compaction occurred under water. Once packed, steady state flow was established through the column with deionized water and a peristaltic pump. Once steady state was achieved, the influent was switched to a colloid suspension made with montmorillonite suspended in deionized water. A sample was taken in the beginning to determine the influent concentration of colloids.

The compositions of Examples 1-4 were compared with two baseline samples that did not use the compositions. The first baseline sample included clean sand that was packed throughout the column. Then, the colloid suspension was pumped through the clean sand to provide a baseline for colloid migration in the absence of the novel material. For the second baseline composition, the middle third of an advective column included a 0.5:9.5 montmorillonite/sand physical mixture.

In Examples 2-4, the effluent was sampled for three minute intervals for 1 hour. Each sample was acidified and analyzed for aluminum.

The first baseline sample experienced colloid breakthrough, instead of colloid generation. The effluent colloid concentration was up to three times higher than the influent for the second baseline sample. The decreasing normalized concentration as a function of time is most likely caused by increasing pore clogging of the colloids within the porous media.

The advective columns for Examples 2-4 showed that colloid generation and colloid transport under water saturated conditions was inhibited. The results for Examples 2-4 also indicated that Mg—Al layered double hydroxide outperforms Zn—Al layered hydroxide and that a small fraction of layered double hydroxide added to clays can effectively inhibit clay erosion and colloid formation.

Example 5

In Example 5, a 1:1 weight/weight mixture of NC-88 layered double hydroxide and montmorillonite were prepared. The layered double hydroxide was prepared by co-precipitation. The montmorillonite sample that we used originated from the Clay Bank Repository at Purdue University.

In Example 5, the two materials were mixed with continuous stirring in a common solution containing the ions of interest. When the stirring ceased, the flocs were allowed to settle with gravity. Samples were withdrawn from the supernatant for centrifugation prior to analysis to ensure removal of any remaining particles. The settling rates of the floc were measured and found to settle rapidly with the supernatant being visually particle free by 2.5 minutes. Suspensions of both montmorillonite and finely ground NC-88 were stable for 24 hours or more.

Example 6

In Example 6, a composite material was synthesized in two steps. In the first step, aqueous mixtures of $AlCl_3$ was mixed with either $MgCl_2$ or $ZnCl_2$ in a 1:3 $Al^{3+}:M^{2+}$ ratio, where M is either Mg or Zn. A quantity of 4.5M NaOH was added to the mixture with constant stirring over the course of several hours until a pH of 8.62+/−0.05 was obtained. The solution was covered and placed in an 80° C. oven overnight.

After heating, the solution was centrifuged to separate it from the remaining solution. The clear solution was decanted, and the material was rinsed with deionized water and re-centrifuged. The rinsing procedure was repeated two more times. Once rinsed, the material was placed in a 40° C. oven overnight. The material is then calcined for four hours at 600° C. with a ramp of 5° C./minute. The two layered double hydroxide samples were ground by hand to a fine powder.

The layered double hydroxides were allowed to coagulate with a montmorillonite sample to make the colloid trap material. The montmorillonite clay was a sodium-rich montmorillonite clay (i.e., SWy-2) that was obtained from the Clay Minerals Society.

Two different mass ratios of layered double hydroxides to clay (i.e., 1:1 and 1:9) were used. The clay was added to about 300-400 mL of deionized water. The clay slurry was vigorously stirred for several minutes to ensure hydration of the clay minerals.

Next, the layered double hydroxides were added. The slurry was mixed, actively, for another minute to produce samples having clear water layers forming above a sludge layer. Settling was typically completed in 2-3 minutes. The water was decanted, and the sludge was collected, air-dried and calcined at 600° C. for 2 hours. The completed material was ground by hand to a fine powder.

Examples 7-9

In Example 7, the colloid transport properties of the materials prepared in Example 6 were compared in a 1-D column, which was 15 cm long and 2.49 cm in diameter. In Example 8, a baseline sample in which only montmorillonite was added to the middle third of the column was compared to the materials of Examples 6-7. In Example 9, a baseline sample that included only sand was compared to the materials of Examples 6-7.

For Example 7, the column was packed in thirds perpendicular to flow. The first and last thirds were clean uniform sand. The sand had been cleaned in about 8 M boiling $HNO_3$. The sand was then rinsed with deionized water until the pH of the water was circum-neutral. The middle zone was filled with a mixture of sand and the newly created materials.

The materials were physically mixed with the sand in a 1:9 mass of material:mass of sand ratio. The sand and sand/material mixtures were loaded in lifts and compacted with a glass rod. As more material was added, the water level was increased so that compaction occurred under water.

Once packed, steady state flow was established through the column with deionized water and a peristaltic pump set at 1 mL/min. Once steady state was achieved, the influent was switched to a colloid suspension made with montmorillonite suspended in deionized water. The suspension was made by adding about 1 g of montmorillonite to 1 L of deionized water. The solution was mixed by hand and allowed to settle for several days. The solution was decanted from any settled solid materials. This same solution was used for all the column experiments. Samples from this reservoir were removed at the start of each experiment to normalize for any variation caused by further settling.

The effluent from the column was directed to sampling tubes, and fractions were collected every three minutes for one hour, or about 2 pore volumes. The solutions were acidified with $HNO_3$ and analyzed for dissolved aluminum via inductively coupled plasma-optical emission spectroscopy. The dissolved aluminum concentration was used as a proxy for particle concentration.

In Example 8, a baseline sample in which only montmorillonite was added to the middle third of the column was compared to the materials of Examples 6-7. For the majority of the experimental timeframe, the effluent colloidal concentration was noticeably higher than the influent concentration. The results indicated that, for the conditions studied, and without the layered double hydroxide present, montmorillonite delaminates and flows out of the column. The decreasing normalized concentration as a function of time is caused by increasing pore clogging of the colloids within the porous media or to depletion of the montmorillonite supplied.

For the baseline sample of Example 9, the transport of the colloids was near ideal with low dispersion. The baseline sample also had a retardation value that was near one, which signified that the colloids behaved conservatively due to the fixed negative charge of the montmorillonite and due to de-protonated surface sites of the silica sand at the pH of deionized water.

The samples that had a 1:1 ratio of Zn-layered double hydroxides to montmorillonite was the least effective at retarding the injected colloids with a retardation value only slightly larger than the colloids moving through clean sand. The results were lower than the results for Mg-layered double hydroxide compounds with the compound that had a 1:9 ratio of Mg-layered double hydroxides to montmorillonite having a retardation value that was double the baseline sample of Example 9.

Calcining the material did not enhance the ability of the material to retard colloid migration. The retardation values for such samples were found to be similar to the values for the materials that included Mg-layered double hydroxides. Calcined materials also had a breakthrough time that was comparable to the breakthrough time for sand-only columns.

The dispersion coefficients for calcined materials were markedly different, which indicated alterations to the flow regime. The dispersion value was an order of magnitude higher for the material that had a 1:1 ratio of Mg-layered double hydroxides to montmorillonite, as compared to any of the other materials that were tested. The material did not retard the colloids to the same extent as the material that had a 1:9 ratio of Mg-layered double hydroxides to montmorillonite, which performed the best in colloid retardation.

The pre-breakthrough colloid concentration was found to be the highest for the material that had a 1:9 ratio of Mg-layered double hydroxides to montmorillonite. The average normalized concentration prior to breakthrough for this material was found to be 0.066. For all of the other materials, the highest pre-breakthrough concentration was found to be 0.032.

It is important to note that the compositions and methods as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures.

Other substitutions, modifications, changes and omissions may be made in the design, operating conditions and arrangement of the exemplary embodiments without departing from the scope of the present application.

The invention claimed is:

1. A method for removing an ionic contaminant from a fluid, comprising:
    introducing a solution comprising a material consisting essentially of an anionic layered double hydroxide with a cationic clay material into the fluid to form a flocculant adsorption material having oppositely charged components, the fluid comprising the ionic contaminant; and
    absorbing the contaminant onto the flocculant adsorption material;
    wherein the anionic layered double hydroxide comprises a crystalline, layered double hydroxide metal complex comprising an interlayer anion; and
    wherein the anionic layered double hydroxide has the general formula:

$$M(II)_{1-x}M(III)_x(OH)_2(Y/n)zH_2O$$

wherein M(II) is a divalent metal cation, M(III) is a trivalent metal cation, x is a positive number between 1.5 and 12, Y is an interlayer anion;
    wherein Y is selected from the group consisting essentially of $CO_3^{2-}$, $SO_4^{2-}$, $PO_4^{3-}$ and $NO^{3-}$;
    n is the charge of the interlayer anion;
    z is a positive number;
    M(II) is a divalent metal selected from the group consisting essentially of $Co^{2+}$, $Ni^{2+}$, $Zn^{2+}$, $Cu^{2+}$, $Cr^{2+}$, $Mn^{2+}$, and $Fe^{2+}$; and
    M(III) is a trivalent metal selected from the group consisting essentially of $Cr^{3+}$, $Fe^{3+}$, $Sc^{3+}$, $Ti^{3+}$, $V^{3+}$, $Mn^{3+}$, $Co^{3+}$, $Ni^{3+}$, $Rh^{3+}$, $Ru^{3+}$, and $Ir^{3+}$.

2. The method of claim 1, wherein the adsorption material includes between about 1 and 50 wt. % of anionic layered double hydroxides.

3. The method of claim 1, wherein the adsorption material includes between about 10 and 50 wt. % of anionic layered double hydroxides.

4. The method of claim 1, wherein the ratio of layered double hydroxide to the cationic clay material is a preselected ratio that corresponds to the ionic contaminant.

5. The method of claim 1, wherein the cationic clay material includes a swelling clay material.

6. The method of claim 1, wherein the cationic clay material includes a smectite clay material.

7. The method of claim 1, wherein the cationic clay material includes a montmorillonite clay.

8. The method of claim 1, wherein the interlayer anion is selected from the group consisting of carbonate, sulfate, phosphate and nitrate anions.

9. The method of claim 1, wherein the anionic layered double hydroxide and the cationic clay material are physically mixed before being introduced into the fluid to form the flocculant in a repository site or landfill.

10. The method of claim 1, further comprising:
    forming the anionic layered double hydroxide by co-precipitation of a divalent metal M(II) salt solution and a trivalent metal M (III) salt solution at a desired M(II)/M(III) molar ratio upon titration with a basic solution in the presence of the chosen interlayer anion to form the anionic layered double hydroxide;
    wherein the anionic layered double hydroxide has the general formula:

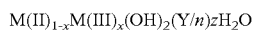

wherein M(II) is a divalent metal cation, M(III) is a trivalent metal cation, x is a positive number between 1.5 and 12, Y is an interlayer anion;

wherein Y is selected from the group consisting essentially of $CO_3^{2-}$, $SO_4^{2-}$, $PO_4^{3-}$ and $NO^{3-}$;

n is the charge of the interlayer anion;

z is a positive number;

M(II) is a divalent metal selected from the group consisting essentially of $Co^{2+}$, $Ni^{2+}$, $Zn^{2+}$, $Cu^{2+}$, $Cr^{2+}$, $Mn^{2+}$, and $Fe^{2+}$; and M(III) is a trivalent metal selected from the group consisting essentially of $Cr^{3+}$, $Fe^{3+}$, $Sc^{3+}$, $Ti^{3+}$, $V^{3+}$, $Mn^{3+}$, $Co^{3+}$, $Ni^{3+}$, $Rh^{3+}$, $Ru^{3+}$, and $Ir^{3+}$.

11. The method of claim 1, wherein the flocculant adsorption material is formed in the presence of sand.

* * * * *